Feb. 25, 1964 J. R. KOBBE ETAL 3,122,652
TIME BASE GENERATOR
Filed Dec. 21, 1960

INVENTORS.
John R. Kobbe
Oswald C. Svehaug
BY Buckhorn, Cheatham & Blore
ATTORNEYS

United States Patent Office 3,122,652
Patented Feb. 25, 1964

1

3,122,652
TIME BASE GENERATOR
John R. Kobbe, Beaverton, and Oswald C. Svehaug, Portland, Oreg., assignors to Tektronix, Inc., Beaverton, Oreg., a corporation of Oregon
Filed Dec. 21, 1960, Ser. No. 77,443
6 Claims. (Cl. 307—88.5)

This invention relates to a time base generator and more particularly to a device in which transistors are employed to provide an output voltage which varies from an initial predetermined voltage substantially linearly with time, which device can be controlled to return the output voltage to the initial voltage to condition the device for a repeat operation.

The present invention involves a time base circuit of the Miller integrator type in which there are two circuit portions isolated from ground or other common conductor by impedances so that any change of current flowing through such impedances will vary the potential of such circuit portions with respect to such common conductor.

One of the two circuit portions is connected to the input of a high gain phase reversing amplifying circuit portion and may therefore be considered to be an input circuit portion and the other of such two circuit portions is connected to the output of such amplifier and may therefore be considered to be an output circuit portion. A capacitor is connected between such input and output circuit portions to provide capacitive negative feedback from the output circuit portion to the input circuit portion which maintains the potential of the input circuit portion very close to a constant value. Also the input circuit portion is supplied with current for charging such feedback capacitor through a resistor from a source of constant potential differing from that of the substantially constant potential of such input circuit portion.

By insuring that the only current which charges the feedback capacitor is that flowing through the resistor mentioned above, the potential of the output circuit portion will vary substantially linearly with time since such resistor is connected between two points of substantially constant potential so that the capacitor charging current is substantially constant. The charge on the feedback capacitor as well as the voltage across such capacitor increases linearly with time so that the feedback capacitor becomes a timing capacitor and the resistor referred to becomes a timing resistor in a time base generator having an output voltage varying substantially with time.

It is relatively easy in vacuum tube circuits to insure that the only current charging the timing capacitor of the time base circuit is that flowing through the timing resistor. Thus during the timing operation of the circuit, the input circuit portion may be entirely isolated from other circuit portions except for the timing resistor, the feedback capacitor and a connection to the control grid of a vacuum tube forming the high gain amplifier. Such grid may have its potential maintained at all times negative with respect to the potential of the cathode of the vacuum tube so that no grid current flows. The only current flowing into or out of the input circuit portion is therefore that flowing through the timing resistor and into or out of the timing capacitor.

Transistors, however, require substantial current flow through their control electrodes and also substantial variation of such current flow when employed as amplifiers to provide output voltage variations of substantial magnitude. Such variable current requirement from the input circuit portion destroys the linearity of the voltage variation of the output circuit portion since the current flowing into the timing capacitor varies with time.

In accordance with the present invention the input circuit portion is isolated from the input electrode of the transistor connected between the two circuit portions as a phase reversing amplifier in order to restore the linearity of the voltage variation of the output circuit portion with time. This can be done by employing a second transistor connected as an emitter follower in the amplifying circuit portion between the input circuit portion and the control electrode of the amplifier transistor. Such second transistor can supply the varying current requirements of the control electrode of the amplifier transistor with very small change in its own base current and with a very small change in the potential of its base. Since the potential of the input circuit portion can therefore remain substantially constant and the base current of the emitter follower transistor referred to remains substantially constant, such base current can be supplied from a source of constant potential differing from that of the input circuit potential through a resistor which can be separate from the timing resistor supplying charging current to the timing capacitor.

Since the phase reversing amplifying transistor is of the high gain low current type, the amplifier circuit portion also includes a third transistor connected as an emitter follower between the output of the amplifying transistor and the output circuit portion for isolating the output of the amplifier transistor from the output circuit portion. Such third transistor supplies the charging current flowing into or out of the other side of the timing capacitor during the timing operation and can also be employed to supply the base current of another emitter follower transistor forming part of a hold off circuit which prevents the control circuit for the time base generator from initiating another operation of the generator circuit until such generator circuit has fully recovered from a preceding timing operation as is more fully described below.

Also the time base generator contains an improved gating circuit portion including a gating transistor and a low reverse current fast acting diode which isolate the input and output circuit portions from each other during the timing operation except for the timing capacitor and amplifier circuit portion described above and which alternatively connects such input and output circuit portions together through a low impedance and also to ground or other common conductor through a low impedance. This restores the generator circuit to its initial condition at the end of a timing operation so as to condition the generator circuit for another timing operation. Thus the latter operation of the gating circuit portion bring the potentials of such portions to predetermined initial potentials which are close to each other.

The gating circuit portion is controlled and actuated by a bistable multivibrator which may free run or which may be triggered by a trigger pulse to cause such multivibrator to change from a first stable state to a second stable state. In its first stable state the multivibrator applies potential to the control electrode of the gating transistor resulting in a low impedance path through such transistor and the gating diode between the output and input circuit portions. In its other state the multivibrator applies a control potential which cuts off the gating transistor and renders the diode referred to nonconducting. This cutting off of the gating transistor initiates a timing operation. The multivibrator is returned to its first state to terminate the timing operation by a voltage derived from the output circuit portion of the generator circuit and applied through the hold off circuit mentioned above. Such hold off circuit introduces a time delay which prevents retriggering of the multivibrator to again initiate a timing operation until the generator circuit has fully recovered from a previous timing operation.

It is therefore an object of the present invention to provide an improved time base generator employing transistors in a circuit providing an output voltage varying linearly with time.

Another object of the invention is to provide a time base generator of the Miller integrator type in which a transistor connected as an emitter follower is employed to isolate a substantially constant potential input circuit portion from the varying input current requirements of a transistor providing a high gain phase reversing amplifier between such input circuit and an output circuit portion having a potential varying linearly with time.

A further object of the invention is to provide a time base generator of the Miller integrator type in which a transistor connected as a phase reversing amplifier between a substantially constant potential input circuit portion and an output circuit portion having a potential varying linearly with time is isolated from both such circuit portions by transistors connected as emitter followers.

A still further object of the invention is to provide a time base generator circuit of the Miller integrator type employing transistors in the integrator circuit, which generator has an improved gating circuit for connecting an input circuit portion to an output circuit portion through a low impedance and alternatively disconnecting such circuit portions from each other.

Other objects and advantages of the invention will appear in the following description of the attached drawing of which:

Figures 1, 2:
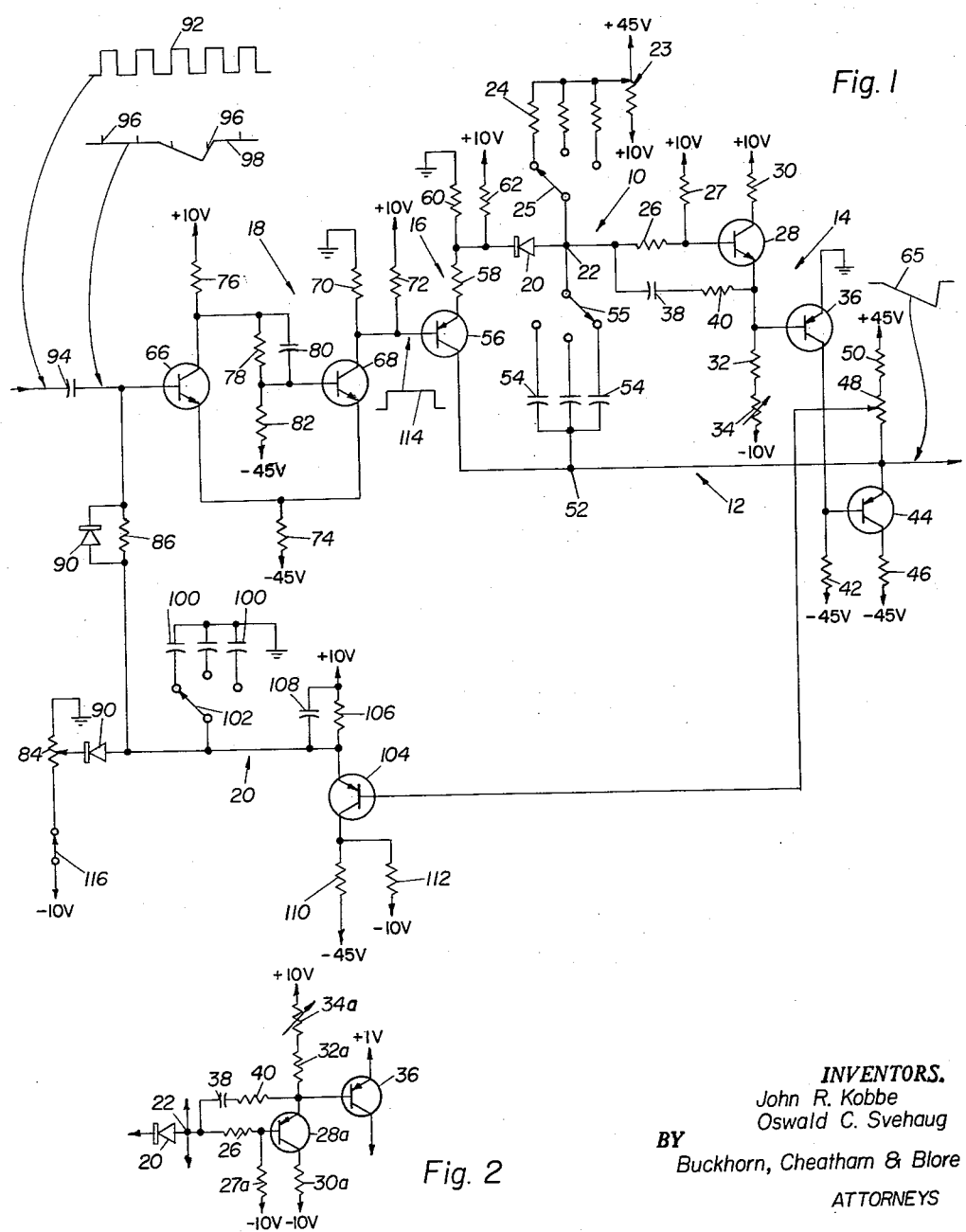
FIG. 1 is a circuit diagram of one embodiment of the invention.
FIG. 2 is a fragmentary circuit diagram showing a modified circuit.

Referring more particularly to the drawing, the time base generator of the present invention includes an input circuit portion indicated generally at 10, an output circuit portion indicated generally at 12 and an amplifier circuit portion indicated generally at 14. The generator circuit also includes a gating circuit indicated generally at 16 controlled by a bistable multivibrator indicated generally at 18 which in turn is in part controlled by a hold off and stability control circuit indicated generally at 20.

The input circuit portion 10 includes a terminal 22 which can be selectively connected to one end of any one of a plurality of timing resistors 24 through a switch 25. The timing resistors have their other ends connected to a source of constant positive potential through the variable tap of a potentiometer 23 connected between two sources of different positive potential. The terminal 22 is also connected through a resistor 26 to the base of a NPN transistor 28 forming part of the amplifier circuit portion 14 and connected as an emitter follower. The transistor 28 also has its base connected to a source of positive potential through a resistor 27 and has its collector connected to a source of positive potential through a resistor 30. The emitter of the transistor 28 is connected to a source of negative potential through a fixed resistor 32 and an adjustable resistor 34 and to the base of a PNP transistor 36 connected as a phase reversing amplifier and also forming part of the amplifier circuit portion 14. The terminal 22 of the input circuit portion is also connected to the base of the transistor 36 through a capacitor 38 and resistor 40 to apply any potential of the input circuit portion which tends to change rapidly directly to the base of the transistor 36 thus avoiding any time delay due to transistor 28.

The transistor 36 has its emitter connected to ground and its collector connected to a source of negative potential through a resistor 42 and to the base of a PNP transistor 44 connected as an emitter follower. The transistor 44 also forms part of the amplifier circuit portion 14 and has its collector connected to a source of negative potential through a resistor 46 and its emitter connected through the end terminals of a potentiometer 48 and a fixed resistor 50 to a source of positive potential. The transistor 44 also has its emitter connected to the terminal 52 forming part of the output circuit portion of the time base generator. Any one of a plurality of feedback and timing capacitors 54 can be selectively connected between the terminal 52 of the output circuit portion 12 and the terminal 22 of the input circuit portion 10 by a switch 55.

The gating circuit 16 is also connected between the two terminals 22 and 52 and includes the emitter-collector circuit of a PNP gating transistor 56, a resistor 58 and a diode 60 in series between such terminals. The transistor 56 also has its emitter connected to ground through the resistor 58 and another resistor 60 and connected to a source of positive potential through the resistor 58 and a resistor 62. When the base of transistor 56 is driven positive relative to its emitter, conduction through the emitter-collector circuit of such transistor is cut off and the potential of its collector makes a positive excursion relative to its potential when the emitter-collector circuit of the transistor 56 conducts current. The resultant positive potential on the cathode of the diode 20 is greater than the potential of the terminal 22 so that diode 20 does not conduct. This effectively disconnects the input circuit portion 10 from the output circuit portion 12 and both of these circuits from other circuits except for the amplifier circuit 14, a feedback and timing capacitor 54 and a timing resistor 24.

When the transistor 56 and the diode 20 are not conducting, any change of potential of the input circuit portion at the terminal 22 is applied to the base of the amplifying transistor 36 through the emitter follower transistor 28 or the capacitor 38 and resistor 40. This change of potential is amplified and has its phase reversed by the amplifier transistor 36 and is applied to the output circuit portion 12 through the cathode follower transistor 44. This amplifier change of potential is applied through a timing and feedback capacitor 54 back to the terminal 22 of the input circuit portion. Since such amplified change of potential has had its phase reversed, the result is that the potential of the input circuit at the terminal 22 cannot change any more than a very slight amount. The potential of the input circuit therefore remains substantially constant and the same is true of the base and emitter of the transistor 28, since the resistor 26 is low in value and under the conditions just described, no appreciable current flows through such resistor. That is to say, the emitter of the transistor 28 maintains a substantially constant voltage difference with respect to the base of such transistor and the base current therefore remains substantially constant. Such base current can therefore be supplied through a resistor 27 of proper value from a source of constant positive potential without affecting any other portions of the circuit.

Since the potential of the terminal 22 remains substantially constant, the current supplied to a timing capacitor 54 through a selected timing resistor 24 from a source of constant positive potential is substantially constant and the voltage across the timing capacitor increase at a uniform rate so that the output voltage from the emitter of the transistor 44 makes a negative excursion at a uniform rate determined by the resistance of the selected timing resistor 24 and the capacitance of the selected timing capacitor 54. By selecting different combinations of a plurality of timing resistors and capacitors a large number of calibrated steps of different timing rates can be obtained when the variable tap of the potentiometer 64 is in the position shown, i.e., at its most positive position. If uncalibrated timing rates between such steps are desired, the slider of the potentiometer 23 can be moved toward a lower positive potential to continuously vary the timing rate within each step. The adjustable resistor 34 is a calibrating adjustment particularly for slow timing rates.

If the base of the transistor 56 is at a negative potential relative to its emitter, base current flows and the collector-emitter circuit of such transistor becomes conductive. The potential of the emitter makes a negative excursion to drive the potential of the cathode of the diode 20 negative with respect to the potential of its anode so that such diode becomes conducting. The resistor 53 has a low value of resistance and the result is that the terminal 52 of the output circuit portion 12 is connected to the terminal 22 of the input circuit portions 10 through a low impedance circuit. The timing capacitors are rapidly discharged and the output voltage rapidly moves in a positive direction to its original predetermined voltage to condition the generator circuit for another timing operation which begins whenever the base of the gating transistor 56 is again driven in a positive direction. The result is an output voltage of the form shown at 65.

The potential of the base of the gating transistor 56 is controlled by the bistable multivibrator circuit 18 including two NPN transistors 66 and 68. The collector of the transistor 68 is connected to ground through a resistor 70 and to a source of positive potential through a resistor 72. The bases of the two transistors 66 and 68 are connected to a source of negative potential through a common resistor 74. When the generator is not performing a timing operation, the collector-emitter circuit of the transistor 68 is conductive so that the potential of its collector is at its most negative value and the potential of its emitter is at its most positive value. This latter positive potential is applied directly to the emitter of the transistor 66. The potential of the emitter of the transistor 66 is thus held positive relative to the base of such transistor to cut off conduction through its collector-emitter circuit. The collector of the transistor 66 is connected to a source of positive potential through a resistor 76 so that the potential of such collector is at its most positive value and such positive value is in part applied to the base of the transistor 68 through a resistor 78 and capacitor 80 to maintain the collector-emitter circuit of the transistor 68 conducting, the proper potential on the base of the transistor 68 being obtained by a voltage dividing circuit between the collector of the transistor 66 and a source of negative potential, the voltage dividing circuit including the resistor 78 and a resistor 82 and having a total value of resistance which is high relative to the resistance of the resistor 76.

Between time base generator operations, the base of the transistor 66 is normally held just sufficiently negative relative to its emitter that its collector-emitter circuit is nonconducting. Thus the base of the transistor 66 is connected to an adjustable tap of a potentiometer 84 through a parallel combination of a resistor 86 and a diode 88 and through another diode 90. In order to trigger time base operations, accurately shaped positive square wave triggering pulses 92 are supplied to the circuit of the present invention from a suitable pulse shaping time base trigger circuit which is not shown. Such pulses are differentiated by an input capacitor 94 to produce sharp positive voltage spikes 96 superimposed on the control potential 98 of the base of the transistor 66. Negative spikes also produced by such differentiation are short circuited by the diode 90 and one of a plurality of time delay capacitors 100 of relatively high value compared to that of the capacitor 80. Such time delay capacitor is selectively connected in series between the diode and ground by a switch 102 and forms part of the hold off circuit 20 described in more detail below.

One of the positive spikes 96 shown in FIG. 1 drives the base of the transistor 66 sufficiently positive that the collector-emitter circuit of such transistor becomes conducting. The collector potential makes a negative excursion to drive the base of the transistor 68 in a negative direction to cut off conduction of the collector-emitter circuit of the transistor 68 and initiate a timing operation of the generator circuit as above described.

The output voltage 65 from the generator circuit is fed back to the base of the transistor 66 through a PNP transistor 104 connected as an emitter follower and the resistor 86. The transistor 104 has its emitter connected to a source of positive potential through a resistor 106 having a capacitor 108 in parallel therewith, which also functions as a time delay capacitor in conjunction with a selected time delay capacitor 100. In order to provide a desired negative potential on the collector of the transistor 104 and at the same time provide a desired resultant resistance in the collector circuit of such transistor, such collector is shown as being connected to two available sources of different negative potential through two resistors 110 and 112. As the base of the transistor 104 has its potential driven in a negative direction by the output voltage 65, the emitter of such transistor is driven in a negative direction and the time delay capacitors 100 and 108 are charged through the transistor 104 and resistors 110 and 112. It is to be noted that a negative excursion of the emitter of the transistor 104 renders the diode 90 nonconducting when the potential of the collector of such transistor becomes more negative than the potential of the variable tap of the potentiometer 84 so that the stability control is disabled under these conditions. The final result is that the base of the transistor 66 is driven sufficiently negative, as indicated by the dip in the control potential 98 on such base, that the collector-emitter circuit of the transistor 66 becomes nonconducting. The collector of such transistor makes a positive excursion which is applied in part to the base of the transistor 68 through the resistor 78 and capacitor 80 to render the collector-emitter circuit of such transistor conducting to stop the timing operation as above described.

When the collector-emitter circuit of the transistor 68 becomes conducting, the emitter of such transistor makes a positive excursion which is applied to the emitter of the transistor 66 to hold such emitter positive relative to the base of the transistor 66 and hold its collector-emitter circuit nonconducting even though the control voltage 98 applied to such base returns to its initial value. The result is that each time the multivibrator is triggered by a voltage spike 96 the output voltage from the collector of the transistor 68 is in the form of a square wave positive square wave gating voltage 114 having a length equal to the length of the time base generator operation of the generator circuit as determined primarily by the timing circuit provided by a timing capacitor 54 and a timing resistor 24.

Subsequent voltage spikes 96 have no effect on the circuits when the transistor 66 has its collector-emitter circuit conducting but, if the multivibrator circuit 18 is again triggered by a voltage spike 96 after the transistor 66 has its collector-emitter circuit again rendered nonconducting and before the generator circuit has fully recovered from a timing operation so that its output voltage has returned to its initial value, the timing operation thus initiated will be defective since it will start from an incorrect initial voltage. This is prevented by the hold off and stability circuit 20 including the transistor 104 and the time delay capacitors 100 and 108. The application of the return portion of the output voltage 65 to the base of the transistor 66 is delayed by the time required to discharge the charged time delay capacitors 108 and 100 through the resistor 106. This means that the sum of the control potential 98 fed back from the output voltage 65 and a voltage spike 96 cannot reach the triggering potential required to render the collector-emitter circuit of the transistor 66 conducting until after the generator circuit has fully recovered. That is to say, the dip in the control potential 98 fed back to the base of the transistor persists until after the generator circuit has fully recovered.

A switch 116 is provided between the stability potentiometer 84 and the source of negative potential to which it is connected. Upon opening such switch the stability control is disabled and the potential of the base of the transistor 66 moves in a positive direction sufficient to trigger the multivibrator circuit 18 and initiate a timing operation of the generator circuit. When the output voltage 65 reaches the required negative value, the multivibrator circuit is restored to its initial condition as above described to stop the timing operation. The hold off circuit 20 allows the generator circuit to recover as above described and the multivibrator circuit is then again triggered to start another timing operation. The result is free running of the generator circuit and control circuit therefor to produce a series of timing operations at a frequency determined primarily by the values of capacitance and resistance of the selected timing capacitor 54 and timing resistor 24, respectively. Closing the switch 116 will restore the circuit to triggering of the timing operation by the triger pulses 92.

In operation of the time base generator of FIG. 1, trigger pulses 92 are delivered to the capacitor 94 and are differentiated thereby to provide sharp positive spikes 96 on a control voltage 98 set between time base generating operations of the generator circuit by the position of the variable tap of the stability control 84. Between such time base generator operations, the collector-emitter circuit of transistor 66 of the multivibrator circuit 18 is nonconducting and the collector-emitter circuit of the transistor 68 of the multivibrator circuit 18 is conducting to hold the base of the gating transistor 56 at its most negative potential and render the collector-emitter circuit of such transistor conducting. This in turn holds the emitter of such transistor 56 at its most negative value to render the diode 20 conducting. Any charge on a timing capacitor 54 selected by the switch 55 is thus discharged through a low impedance provided by the diode 20 and the collector-emitter circuit of the transistor 56. Also current flowing through the timing resistor 24 connected into the circuit by the switch 25 from a source of positive potential flows to ground through the diode 20 and resistor 60. The potential of the terminals 22 and also that of the terminal 52 are brought quite close to ground potential to produce the portion of the output voltage 65 between time base generating operations.

Negative voltage spikes also produced by differentiation of the square wave trigger pulses 92 by the capacitor 80 are short circuited through the diode 90 and one of the time delay capacitors 100 in conjunction with the time delay capacitor 108. If the variable tap of the stability control 84 is correctly positioned, one of the positive voltage spikes 96 drives the base of the transitor 66 sufficiently positive to render the collector-emitter circuit of such transistor conducting. By the multivibrator operation described above the collector-emitter circuit of the transistor 68 is rendered nonconducting and the collector-emitter circuit of the transistor 78 is held in conducting condition until again rendered nonconducting by feedback of the output voltage of the time base generating circuit.

When the collector-emitter circuit of transistor 68 becomes nonconducting, the collector of such transistor makes a positive excursion to cause the emitter of the transistor 56 to also make a positive excursion to cut off conduction through the diode 20. Current through a selected timing resistor 24 then charges a selected timing capacitor 54. The terminal 22 is driven very slightly in a positive direction and this positive voltage is applied to the base of the phase reversing amplifying transistor 36 through the emitter follower transistor 28 and also for a short initial time directly through the circuit including the capacitor 38 and resistor 40. The negative output of the amplifying transistor 36 is applied to the terminal 52 through the emitter follower transistor 44 to drive such terminal in a negative direction. This negative excursion of the terminal 22 is applied back to the terminal 22 through a feedback and timing capacitor 54 to prevent the potential of such terminal 22 from going more than a very slight amount positive so that the potential of the terminal 22 remains substantially constant. This produces a time base generating operation resulting in the negative going ramp of the output voltage 65.

Since the potential of the terminal 22 remains substantially constant and the charging current for a timing capacitor 54 is supplied from a source of constant potential through a timing resistor, the change of output voltage during a time base generating operation is substantially linear with respect to time. Also since the resistor 27 is connected between a source of constant potential and the terminal 22 through a resistor 26 of low value, the current through such resistor 27 remains substantially constant. The resistance of the resistor 27 can be of the proper value to cause the current therethrough to be equal to the base current of the transistor 28 which is also substantially constant. The base current of the transistor 28 thus has substantially no effect on the time base generating operation.

A portion of the output voltage is fed back through the variable tap of the potentiometer 48 and the emitter follower transistor 104 and the resistor 86 to the base of the transistor 66. The diode 90 enables this negative voltage to be produced on the base of the transistor 66 even though the stability control is of low impedance, since the diode 90 becomes nonconducting when the output of the emitter follower 104 becomes negative relative to the variable tap of the stability control 84. When the resulting control voltage 98 becomes sufficiently negative, the collector-emitter circuit of the transistor 66 again becomes nonconducting thus rendering the collector-emitter circuit of the transistor 56 conducting to discharge the charged timing capacitor 54 as above described and terminate the time base generating operation of the generator circuit. The output voltage 65 rapidly returns to the initial value of such voltage before the time base generating operation.

While the collector-emitter circuit of the transistor 66 is conducting during a time base generating operation, subsequent positive voltage spikes 96 have no effect on the circuit. As soon as such collector-emitter circuit again becomes nonconducting as just described above, a positive voltage spike 96 could again initiate a time base generating operation by driving the base of the transistor 66 sufficiently positive to render the collector-emitter circuit of such transistor conducting. This could occur before the time base generator circuit fully recovers and before the output voltage 65 returns to its initial value so as to result in starting a time base generating operation at an incorrect initial output voltage. The application of the return portion of the output voltage to the base of the transistor 66 is, however, delayed by the time required to discharge the time delay capacitor 108 and a selected time delay capacitor 100 through the resistor 106 so that the base of the transistor 66 cannot be driven sufficiently positive to initiate a repeat time base generating operation until after the time base generator circuit has fully recovered from a preceding time base generating operation.

The rate at which the output voltage varies during the time base generating operation can be varied in steps by the values of resistance and capacitance of the timing resistors 24 and timing capacitors 54 selected by the switches 25 and 55, respectively. Continuous variation of such rate can be obtained in each step by moving the variable tap of the potentiometer 23. The magnitude of the output voltage reached in a time base generating operation is determined by the setting of the variable tap of the potentiometer 48.

There is an appropriate time delay capacitor 100 for each rate of output voltage variation as determined by the selected timing resistor 24 and timing capacitor 54 selected by the switches 25 and 54, respectively. It is apparent that the switches 25, 55 and 102 may be ganged and have appropriate contacts to connect in the proper time delay capacitor for each timing rate.

The stability control enables the circuit to be adjusted so that a positive voltage spike 96 just drives the base of the transistor 66 sufficiently positive to initiate a time base generating operation, thus insuring that the hold off circuit 20 can operate properly to prevent such initiation before the output voltage has returned to its initial value. When the switch 116 is opened, the base of the transistor 66 is driven sufficiently positive immediately after each time base generating operation to initiate another such operation irrespective of the presence of voltage spikes 96 so that the entire circuit free runs as an oscillator having its frequency primarily set by the resistance and capacitance values of the timing resistor 24 and capacitor 54 selected. The hold off circuit 20 still operates, however, to prevent the beginning of a subsequent time base generating operation before the output voltage returns to its initial value.

The circuit described above has been found to be sufficiently temperature stable for employment in practical oscilloscopes. Even though the diode 20 is carefully selected to have low leakage current when cut off, it does have some leakage current during a time base generating operation and the amount of such leakage current varies with temperature. This produces a change in the charging current of the selected timing capacitor depending upon the temperature of the diode 20 and a resulting variation of timing rate of the generator circuit with temperature. Also the base current of the transistor 28 varies with temperature to also vary the timing rate with temperature. In the circuit shown, employing an NPN transistor for the transistor 28, these effects are cumulative.

By slightly increasing the complexity of the voltage supply circuits, a PNP transistor 28a shown in FIG. 2 can be substituted for the transistor 28 of FIG. 1. Such transistor 28a can have its emitter connected to a source of positive potential through a fixed resistor 32a and an adjustable calibrating resistor 34a and have its collector connected to a source of negative potential through a resistor 30a. The base current for transistor 28a is supplied from a source of negative potential through a resistor 27a. The emitter of the amplifying and phase reversing transistor 36 is connected to a low voltage regulated source of positive potential but other than the change described above, the remainder of the circuit associated with the fragmentary circuit of FIG. 2 may be the same as that of FIG. 1. The effect of variation of the base current of transistor 28a with temperature is opposite to that of the variations of leakage current of the diode 20 with temperature so that the two effects on the timing rate tend to cancel to render the timing rates more stable. In the circuit just described, the base of the transistor 28a is of N semiconductor material and the element of the diode to which it is connected of P semiconductor material so that the base of such transistor should be of opposite semiconductor material from that of the element of the diode to which it is connected in order to obtain the cancellation of temperature effects just discussed.

It will be apparent that the circuts of FIGS. 1 and 2 can have all applied and output potentials reversed by substituting NPN transistors for PNP transistors and vice versa and also reversing the various diodes shown.

We claim:

1. A time base generator circuit comprising input end output circuit portions and means to maintain potential on said input portion substantially constant and cause the potential on said output portion to change from a predetermined potential substantially linearly with time, said means including a first transistor connected as an emitter follower and having its base connected to said input portion, a second transistor connected as a phase reversing amplifier and having its base connected to the output of said first transistor, a third transistor connected as an emitter follower and having its base connected to the output of said second transistor and its output connected to said output portion, a feedback and timing capacitor connected between said input and output portions, and resistor means for supplying a substantial constant current to said input portion to charge said capacitor and supply a substantially constant base current to said first transistor.

2. A time base generator circuit comprising input and output circuit portions and means to maintain the potential on said input portion substantially constant and cause the potential on said output portion to change from a predetermined potential substantially linearly with time, said means including a first transistor connected as an emitter follower and having its base connected to said input portion, a second transistor connected as a phase reversing amplifier and having its base connected to the output of said first transistor, a third transistor connected as an emitter follower and having its base connected to the output of said second transistor and its output connected to said output portion, a feedback and timing capacitor connected between said input and output portions, a timing resistor connected between said input portion and a source of constant potential to supply charging current to said capacitor and a separate resistor connected between said input portion and a source of constant potential to supply base current for said first transistor.

3. A time base generator circuit comprising input and output circuit portions and means to maintain the potential on said input portion substantially constant and cause the potential on said output portion to change from a predetermined potential substantially linearly with time, said means including a first transistor connected as an emitter follower and having its base connected to said one portion, a second transistor connected as a phase reversing amplifier and having its base connected to the output of such first transistor, a third transistor connected to the output of said second transistor and its output connected to the output of sai dsecond transistor and its output connected to said output portion, a feedback and timing capacitor connected between said input and output portions, and resistor means to supply a substantially constant charging current to said capacitor and to supply a substantially constant base current to said first transistor, said circuit having gating means to connect said input and output portions together through a low impedance to discharge said capacitor and rapidly bring said output portion to said predetermined potential and means for disabling said gating means to cause said timing capacitor to be charged through said resistor means.

4. A time base generator circuit comprising input and output circuit portions and means to maintain the potential on said input portion substantially constant and cause the potential on said output portion to change from a predetermined potential substantially linearly with time, said means including a first transistor connector as an emitter follower and having its base connected to said one portion, a second transistor connected as a phase reversing amplifier and having its base connected to the output of such first transistor, a third transistor connected as an emitter follower and having its base connected to the output of said second transistor and its output connected to said output portion, a feedback and timing capacitor connected between said input and output portions, a timing resistor connected between said input portion and a source of constant potential to supply charging current to said capacitor and a separate resistor connected between said input portion and a source of constant potential to supply base curent for said first transistor said circuit having gating means to connect said input and output portions together through a low impedance to discharge said capacitor and rapidly bring said output portion to said predetermined potential and means for disabling said gating means to cause said timing capacitor to be charged through said timing resistor.

5. A time base generator circuit comprising input and output circuit portions and means to maintain the potential on said input portion substantially constant and cause the potential on said output portion to change in one direction from a predetermined potential substantially linearly with time, said means including a first transistor connected as an emitter follower and having its base connected to said one portion, a second transistor connected as a phase reversing amplifier and having its base connected to the output of said first transistor, a third transistor connected as an emitter follower and having its base connected to the output of said second transistor and its output connected to said output portion, a feedback and timing capacitor connected between said input and output portions, and resistor means connected to said input portion to supply a substantially constant charging current to said capacitor and to supply a substantially constant base current to said first transistor, said circuit having gating means to connect said input and output portions together through a low impedance to discharge said capacitor and rapidly bring said output portion to said predetermined potential and means for disabling said gating means to cause said timing capacitor to be charged through said timing resistor, said gating means including a diode and a gating transistor having its emitter to collector circuit connected for current flow between said input and output portions in series with said diode when said transistor is conducting, said diode being connected to be reversely biased to isolate said input portion from said gating transistor when said gating transistor is nonconducting, and control means connected to the base of said gating transistor to alternately render said gating transistor conducting and nonconducting.

6. A Miller integrator type of time base generator circuit comprising input and output circuit portions and means to maintain the potential on said input portion substantially constant and cause the potential on said output portion to change in one direction from a predetermined potential substantially linearly with time, said means including a first transistor connected as an emitter follower and having its base connected to said one portion, a second transistor connected as a phase reversing amplifier and having its base connected to the output of said first transistor, a third transistor connected as an emitter follower and having its base connected to the output of said second transistor and its output connected to said output portion, a feedback and timing capacitor connected between said input and output portions, and resistor means connected to said input portion to supply a substantially constant charging current to said capacitor and to supply a substantially constant base current to said first transistor, said circuit having gating means to connect said input and output portions together through a low impedance to discharge said capacitor and rapidly bring said second portion to said predetermined potential and means for disabling said gating means to disconnect said input and output portions and cause said timing capacitor to be charged through said timing resistor, said gating means including a diode and a gating transistor having its emitter to collector circuit connected for current flow between said input and output portions in series with said diode when said transistor is conducting, said diode having one element connected to said input circuit portion and being connected to be reversely biased to isolate said gating transistor from said input portion when said gating transistor is nonconducting, and control means connected to the base of said gating transistor to alternately render said gating transistor conducting and nonconducting, said first transistor having a base of semiconductor material of opposite type from that of the element of said diode connected to said input portion of said circuit.

References Cited in the file of this patent
UNITED STATES PATENTS
2,695,955    Casey _____ Nov. 30, 1954

UNITED STATES PATENT OFFICE
CERTIFICATE OF CORRECTION

Patent No. 3,122,652

February 25, 1964

John R. Kobbe et al.

It is hereby certified that error appears in the above numbered patent requiring correction and that the said Letters Patent should read as corrected below.

Column 6, line 24, strike out "that", second occurrence; column 7, line 14, for "triger" read -- trigger --; column 9, line 34, for "omitter" read -- emitter --; line 63, for "end" read -- and --; column 10, line 36, before "to" insert -- as an emitter follower and having its base connected --; line 37, strike out "nected to the output of sai dsecond transistor and its out-".

Signed and sealed this 7th day of July 1964.

(SEAL)
Attest:

ERNEST W. SWIDER
Attesting Officer

EDWARD J. BRENNER
Commissioner of Patents